US008348200B2

(12) United States Patent
Saddoughi et al.

(10) Patent No.: US 8,348,200 B2
(45) Date of Patent: Jan. 8, 2013

(54) SYNTHETIC JET ACTUATOR SYSTEM AND RELATED METHODS

(75) Inventors: Seyed Gholami Saddoughi, Clifton Park, NY (US); Grover Andrew Bennett, Schenectady, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 569 days.

(21) Appl. No.: 12/646,338

(22) Filed: Dec. 23, 2009

(65) Prior Publication Data

US 2011/0147476 A1 Jun. 23, 2011

(51) Int. Cl.
*B64C 21/04* (2006.01)
*B64C 21/06* (2006.01)

(52) U.S. Cl. .................. 244/208; 244/204.1; 244/200.1; 244/204; 244/205

(58) Field of Classification Search ............... 244/204.1, 244/205, 207–209, 200.1, 203, 204
See application file for complete search history.

(56) References Cited

U.S. PATENT DOCUMENTS

| | | | | |
|---|---|---|---|---|
| 3,447,322 | A | 6/1969 | Mastrup | |
| 3,647,137 | A | 3/1972 | Naydan | |
| 3,700,269 | A | 10/1972 | Salata | |
| 4,335,465 | A | 6/1982 | Christiansen et al. | |
| 4,647,949 | A | 3/1987 | Sapitowicz et al. | |
| 6,056,204 | A | 5/2000 | Glezer et al. | |
| 6,404,109 | B1 * | 6/2002 | Takeuchi et al. | 310/348 |
| 6,472,799 | B2 * | 10/2002 | Takeuchi et al. | 310/348 |
| 6,554,607 | B1 | 4/2003 | Glezer et al. | |
| 6,671,939 | B2 * | 1/2004 | Takeuchi et al. | 29/25.35 |
| 6,715,192 | B2 * | 4/2004 | Takeuchi et al. | 29/25.35 |
| 6,883,215 | B2 * | 4/2005 | Takeuchi et al. | 29/25.35 |
| 6,925,693 | B2 * | 8/2005 | Takeuchi et al. | 29/25.35 |
| 7,748,664 | B2 * | 7/2010 | Boespflug et al. | 244/208 |
| 7,967,258 | B2 * | 6/2011 | Smith et al. | 244/207 |
| 7,988,103 | B2 * | 8/2011 | Land et al. | 244/207 |
| 8,047,233 | B2 * | 11/2011 | Clingman | 137/809 |
| 2002/0010990 | A1 * | 1/2002 | Takeuchi et al. | 29/25.35 |
| 2002/0096972 | A1 * | 7/2002 | Takeuchi et al. | 310/328 |
| 2002/0101136 | A1 * | 8/2002 | Takeuchi et al. | 310/348 |
| 2002/0195526 | A1 * | 12/2002 | Barrett et al. | 244/208 |
| 2004/0021041 | A1 | 2/2004 | Grossman et al. | |
| 2004/0091608 | A1 * | 5/2004 | Takeuchi et al. | 427/100 |
| 2007/0152104 | A1 * | 7/2007 | Cueman et al. | 244/198 |

(Continued)

OTHER PUBLICATIONS

Cybyk et al., "SparkJet Actuators for Flow Control" The Johns Hopkins University Applied Physics Laboratory, Mar. 2007, pp. 1-27.

*Primary Examiner* — Philip J Bonzell
(74) *Attorney, Agent, or Firm* — Bracewell & Giuliani LLP

(57) ABSTRACT

Systems and methods for controlling fluid flow utilizing a synthetic jet actuator, are provided. An example of a synthetic jet actuator system includes a synthetic jet actuator including a dual bimorph subsystem to provide low, medium, and high synthetic jet velocities and/or fine flow control response, and an arc-forming subsystem to provide enhanced pressure, velocity, and mass flow performance, enhanced flow control response, and/or heating of the fluid within the bimorph chamber to extend the performance or operating margin of the dual bimorph subsystem of the synthetic jet actuator. The arc-forming subsystem includes a pair of electrodes interfaced with inner surface walls of the dual bimorph subsystem. Various configurations of power supplies can be utilized to provide simultaneous function to both the subsystem and the arc-forming subsystem to allow selective activation.

26 Claims, 6 Drawing Sheets

U.S. PATENT DOCUMENTS

2007/0272393 A1 11/2007 Reichenbach et al.
2008/0087771 A1* 4/2008 Boespflug et al. ............ 244/207
2008/0115477 A1* 5/2008 Samimy et al. ................ 60/39.5
2009/0141065 A1 6/2009 Darbin et al.
2010/0053891 A1* 3/2010 Arik et al. ..................... 361/692
2010/0229952 A1* 9/2010 Smith et al. ....................... 137/1
2010/0284825 A1* 11/2010 Land et al. ...................... 417/48

* cited by examiner

SYNTHETIC JET ACTUATOR SYSTEM AND RELATED METHODS

BACKGROUND OF THE INVENTION

1. Field of the Invention

The present invention relates generally to flow field management. More specifically, the present invention relates to systems for manipulating fluid flows utilizing synthetic jet actuators.

2. Description of the Related Art

Adverse (pressure gradient) fluid flows generated over aerodynamic surfaces can buffet and fatigue any downstream structures so exposed. Additionally, such flows can affect efficiency by increasing drag or resistance over the surface. Such adverse fluid flows can be generated at the fore body of an aircraft or other upstream structure, and damage control surfaces, engines, after body/empennage, nacelles, turrets, or other structures integrated into the airframe. Additionally, these adverse fluid flows can be ingested within engine air intakes or other like air inlets leading to poor performance and/or stalling of the aircraft engines. Stalling the aircraft engine creates a potentially hazardous condition. Next generation aircraft, such as blended wing body, compound this problem by incorporating gas turbine inlets with serpentine spines within the air frame. Additionally, exotic aperture shapes for the inlet and outlet may cause excessive propulsion performance losses. These losses emanate from strong secondary flow gradients in the near wall boundary of the airflow, which produce coherent large-scale adverse fluid flows.

In the past, aircraft components were designed to minimize the strength of adverse pressure gradient flow fields to reduce the extent of or eliminate the separation of boundary layer flow from aircraft surfaces to reduce the destructive structural impact of separated flow on aircraft components and performance. This approach limits design options and increases vehicle size, weight and cost. Alternatively, the components in the path of the adverse fluid flows were structurally hardened or replaced more frequently to avoid failures resulting from these stresses. Placing components, such as engines or control surfaces, in non-optimal positions in order to reduce these stresses often results in reduced vehicle performance. Similarly, adding structural weight to support increased stress loads caused by the flow field vortices also results in reduced vehicle performance.

Other solutions include the employment of active or passive control flows through mass injection using positive and/or zero mass devices to mitigate the effects of the adverse flow fields. These control jets manipulate the boundary layer, for example, through induced mixing between the primary fluid flow and the secondary fluid flow. The mixing is promoted by vortices trailing longitudinally near the edge of the boundary layer. Fluid particles with high momentum in the stream direction are swept along helical paths toward the aircraft surfaces to mix with and, to some extent replace low momentum boundary layer flow. This is a continuous process that provides a source to counter the natural deceleration of the flow near a solid surface in a boundary layer that can lead to flow separation in regions with adverse pressure gradients and low energy secondary flow accumulation.

It has been found that mass injection and other flow control devices can be used in place of mechanical flight or other vehicle controls. Mass injection devices utilizing a positive mass flow include, for example, passive jet spoilers which can utilize engine bleed air, ram air from an inlet or scoop, or a air/fluid pump. Such devices, however, require pneumatic/fluid conduits and/or manifolds to bring the control jets to regions requiring flow-control authority. Additionally, utilization of such devices result in added structural weight to supply and support the control jets, which results in reduced vehicle performance.

Various other types of positive mass flow devices include combustion-driven jet actuators, which oxidize a gaseous fuel-air mixture. Specifically, such combustion-driven jet actuators include a combustion chamber that is filled with a combustible mixture which is then ignited, resulting in high pressures inside the chamber and mass expulsion through a chamber orifice. Besides the necessary fuel and air conduits, such devices also require a fuel storage capability, mechanical valves, and a means for igniting the fuel, which result in added structural weight to supply and support the control jets, which results in reduced vehicle performance.

Zero mass flow-capable devices include mechanical synthetic jets, single or dual bimorph synthetic jets, and spark jets. Synthetic jets, for example, which may be large scale devices or small scale Micro-fabricated Electro-Mechanical Systems (MEMS) devices, can be employed along an airfoil surface to control flow separation on the airfoil. A typical synthetic jet actuator includes a housing forming an internal chamber and an orifice in a wall of the housing. The actuator further includes a mechanism in or about the housing for periodically changing the volume within the internal chamber so that a series of fluid vortices are generated and projected into an external environment flow beyond the orifice of the housing. Various volume changing mechanisms include, for example, a reciprocating piston configured to move so that fluid is moved in and out of the orifice during reciprocation of the piston, and/or a flexible diaphragm forming one or more walls of the housing. In a similar device, the flexible diaphragm can instead be actuated by a piezoelectric actuator, such as, for example, one or more bimorph piezoelectric plates or other appropriate means connected by a flexible hinge or hinges. Regardless of the configuration, the fluid moved may be either a liquid or gas, depending upon the state of the operational environment.

Mechanical and bimorph synthetic jet actuators employing a flexible diaphragm typically include a control system is to create time-harmonic motion of the diaphragm. As the walls of the diaphragm (or diaphragms) move into the center of the chamber, the chamber volume decreases, and fluid is ejected from the chamber through a chamber orifice. As the fluid passes through the orifice, the flow separates at the sharp edges of the orifice and creates vortex sheets which roll up into vortices. These vortices move away from the edges of the orifice under their own self-induced velocity. As the vortices travel away from the orifice, they synthesize a jet of fluid, a “synthetic jet,” through entrainment of the ambient fluid. As the walls of the diaphragm move outward with respect to the center of the chamber, increasing the chamber volume, ambient fluid is drawn in from large distances from the orifice and into the chamber. Notably, the inventors have found that such synthetic jet actuators, in general, and the dual bimorph synthetic jet actuators, in particular, are especially well-suited at low, medium, and relatively high jet velocities and where fine flow control is needed.

The other aforementioned zero mass-capable device, a spark jet, can also be employed, for example, along an airfoil surface in a similar fashion to that of the mechanical or bimorph synthetic jets to control flow separation on the airfoil. Akin to the mechanical or bimorph synthetic jets, a typical spark jet also includes a housing forming an internal chamber and a chamber orifice in a wall of the housing. In contrast to the mechanical or bimorph synthetic jet actuators, however, the spark jet includes electrodes to produce an electrical discharge to heat the fluid within the internal chamber, which causes the fluid to accelerate out of the chamber orifice. The walls of the spark jet are generally relatively rigid in order to withstand the chamber pressure resulting from the rapid heating of the fluid within the chamber, without significantly deforming. The inner chamber pressure is relieved by the exhaustion of the heated fluid through the chamber orifice. Fluid is returned to the inner chamber through a corresponding decrease in pressure caused by cooling of the chamber walls and the gases remaining within the internal chamber upon removal of the current to the electrodes. Notably, the inventors have recognized that although the maximum frequency of the spark jet is typically less than that of the typical bimorph synthetic jet due to its dependence upon the speed of cooling of the chamber between cycles, the rise time associated with the generation of operational pressure and mass flow during each spark jet cycle can be less than that of conventional synthetic jet actuators. The inventors have further recognize that such capability, if harnessed, could be utilized to enhance the performance of an airfoil utilizing solid-state synthetic jet actuators for primary flow control, particularly where changes in jet velocities and large flow disruption may be periodically needed, which approach or exceed the capability of the solid-state synthetic jet actuator.

Accordingly, the inventors have recognized that there is a need for flow control systems, apparatus, devices, controllers, program product, and methods which provide the advantages of both the solid-state synthetic jet actuator and the spark jet. Particularly, the inventors have recognized there is a need for flow control systems, apparatus, devices, controllers, program product, and methods which utilize the concepts of a spark jet to selectively enhance/extend performance of a dual bimorph synthetic jet, such as, for example, when maximum performance is desired.

SUMMARY OF THE INVENTION

In view of the foregoing, various embodiments of the present invention provide synthetic jet actuator systems, apparatus, and synthetic jet actuators, which include and employ an arc-forming subsystem either in conjunction with or in combination with a dual bimorph subsystem as a dynamic flow control device. Various embodiments of the present invention also include software, program product, firmware, methods, and controllers which provide for synchronizing and timing electronic firing of electrodes of the arc-forming subsystem to coincide with movement of the walls of a chamber of the dual bimorph subsystem of a synthetic jet actuator to thereby selectively enhance performance and/or to provide an extended operating margin to the dual bimorph subsystem of the synthetic jet actuator. Various embodiments of the present invention further provide a synthetic jet actuator comprising a diaphragm/bellows-based dual bimorph synthetic jet actuator enhanced with electrodes and interfaced with a control system to synchronize application of the electrode actuation components of the synthetic jet actuator with the actuation of the dual bimorph actuation components.

More specifically, an example of an embodiment of a synthetic jet actuator system includes a synthetic jet actuator including an actuator chamber extending between an inner surface of a first wall of a pair of opposing walls containing a pair of piezoelectric layers forming a bimorph and an inner surface of a second wall also containing a pair of piezoelectric layers forming a bimorph. The actuator chamber is dimensioned to expel a fluid through an associated chamber orifice responsive to electrical actuation of the first and the second walls resulting in complementary inward movement of at least portions of the walls toward a center of the chamber, and to receive a fluid responsive to outward movement of the at least portions of the first and the second walls away from the center of the chamber. The synthetic jet actuator also includes a first electrode physically connected to the inner surface of the first wall and a second electrode physically connected to the inner surface of the second wall and positioned adjacent the first electrode, ideally at or near a medial portion thereof, to provide for formation of an arc therebetween when subjected to a certain minimum electrical potential therebetween (e.g., determined based upon the expected type of environmental fluid and gap distance between electrodes) to thereby enhance fluid expulsion from the chamber.

According to an embodiment of the system, the pair of electrodes are also electrically connected to separate base terminals of the pair of opposing walls such as, for example, the negative terminals of the respective first and second walls. Accordingly, the system can also include a first power supply electrically connected to the first wall to apply electrical potential to the pair of piezoelectric layers of the first wall to actuate the first wall, and a second power supply comprising a second power supply electrically connected to the second wall to apply electrical potential to the pair of piezoelectric layers of the second wall to actuate the second wall. According to a preferred configuration, the base voltage of the electrical potential applied to the innermost one of the pair of piezoelectric layers of the first wall by the first power supply is also applied to the first electrode. Similarly, the base voltage of the electrical potential applied to the innermost one of the pair of piezoelectric layers of the second wall by the second power supply is also applied to the second electrode.

Additionally, according to a first preferred configuration, there is a substantial voltage offset between negative terminals of the first and the second power supply resulting in a value of the base voltage provided, for example, to the negative terminal of the second wall being substantially greater than the value of the base voltage provided, for example, to the negative terminal of the first wall. The voltage offset results in a substantial voltage potential between the first and the second electrodes. The voltage potential is set sufficiently high to provide for the break down of the air or other environmental fluid within the synthetic jet chamber at a between-electrode gap distance selected to be at least equal to a distance between the first and the second electrodes when the first and the second walls are actuated to provide maximum inward deflection.

According to a second preferred configuration, the second power supply is a switchable power supply configured to selectively switch between providing the second wall an electrical potential having a base voltage sufficiently offset from the base voltage of the electrical potential provided to the first wall to provide for formation of the arc between the first and the second electrodes to enhance fluid expulsion from the chamber, as described above, and providing the second wall an electrical potential having a base voltage insufficiently offset from the base voltage of the electrical potential provided to the first wall to allow operation of the dual bimorph subsystem of the synthetic jet actuator without the assistance of the arc-forming subsystem.

According to an embodiment of the system, a controller is positioned in communication with the second switchable power supply and/or a flight control computer of an aircraft to switch the second power supply electrical potential usage between the electrical potential having the base voltage with a sufficiently high offset value and the base voltage having insufficient offset responsive to control signals indicating a desired level of fluid expulsion from the chamber, and/or feedback signals from a set of sensors indicating that the output without the assistance of the arc-forming portion of the synthetic jet is or will be insufficient.

As noted above, various embodiment of the present invention also include methods for controlling fluid flow utilizing one or more embodiments of a synthetic jet actuator and associated system components. For example, a method of controlling fluid flow according to an exemplary embodiment of the present invention includes the steps of actuating a pair of opposing walls of a dual bimorph portion of a synthetic jet actuator configured to contract inwardly to expel a fluid from within a dual bimorph chamber or cavity formed at least partially by the opposing chamber walls to thereby provide flow control of an environmental flow. The method also includes forming an arc between a pair of opposing electrodes each separately connected to an inner surface of a different one of the opposing walls to enhance expulsion of the fluid from within the chamber when performance enhancement or an extended operating margin is desired over that capable of being supplied by the dual bimorph portion (subsystem) of the synthetic jet actuator. In operation, to achieve the performance enhancement and/or extended operating margin provided by the arc, a large voltage potential is applied to the pair of opposing electrodes timed or otherwise oriented to the contraction of the dual bimorph portion of the actuator, which results in the arc passing through a portion of the chamber between the electrodes. The arc causes considerable heating of the localized gasses or other fluids within the chamber causing expansion of the fluids therein which leads to an enhanced (increased) exit velocity for the exiting synthetic jet, thus, extending the useful range of the synthetic jet actuator.

According to an embodiment of the method, the step of forming an arc includes the steps of associating the electrodes with the negative terminals of the opposing walls, and applying a similar voltage potential to the terminals of both of the opposing walls, but with one negative terminal of one of the walls set at a low value such as, for example, 0 V, and the other negative terminal set at a high value such as, for example, 1000 V to form a voltage potential of 1000 V between the electrodes. When the opposing walls contract inwardly to a certain critical gap distance during bimorph operation, the 1000 V voltage potential causes the fluid within the synthetic jet actuator chamber to break down, thus forming the arc.

According to another embodiment of the method, the step of forming an arc includes, for example, the steps of setting one negative terminal of a first one of the pair of opposing walls to a low value such as, for example, 0 V, and setting the negative terminal of the second one of the pair of opposing walls initially to a low value such as, for example, 0 V, but then selectively switchably setting the voltage applied to the negative terminal of the second one of the pair of opposing walls to an offset base voltage of, for example, 1000 V to selectively form a voltage potential of 1000 V between electrodes, and thus, selectively form the arc. Advantageously, this procedure results in selective control of fluid temperature, pressure, and exit velocity of fluid from within the synthetic jet actuator chamber, effectively extending the performance and/or operating margin of the dual bimorph subsystem portion of the synthetic jet actuator.

According to another embodiment of the present invention, the step of actuating the pair of opposing walls to contract inwardly toward the center of the chamber includes the step of applying a voltage potential of, for example, 150 V to both the bimorph of the opposing walls to expel the fluid from within the synthetic jet actuator chamber. Correspondingly, the step of forming an arc includes the step of applying to the pair of electrodes, a voltage potential of, for example, 1000 V or other voltage potential sufficient to cause the fluid within the synthetic jet actuator chamber to break down to thereby enhance expulsion of the fluid within the chamber. According to a preferred implementation, the step is performed, for example, in response to detecting insufficient output from the synthetic jet actuator and/or receiving control signals indicating a desired level of fluid expulsion from the synthetic jet actuator chamber to thereby extend the performance and/or operating margin of the dual bimorph subsystem portion of the synthetic jet actuator.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

FIGS. 1-10 illustrate examples of embodiments of a synthetic jet actuator system 30 and methods for controlling a fluid flow which can provide flow control through application of the concepts associated with implementation of a dual bimorph synthetic jet and the concepts associated with implementation of arc-forming subsystems to thereby provide a system that is particularly well-suited to operate when relatively low and medium jet velocities and where fine flow control is needed, and when relatively high jet velocities and large flow disruption is needed.

Figure 1:
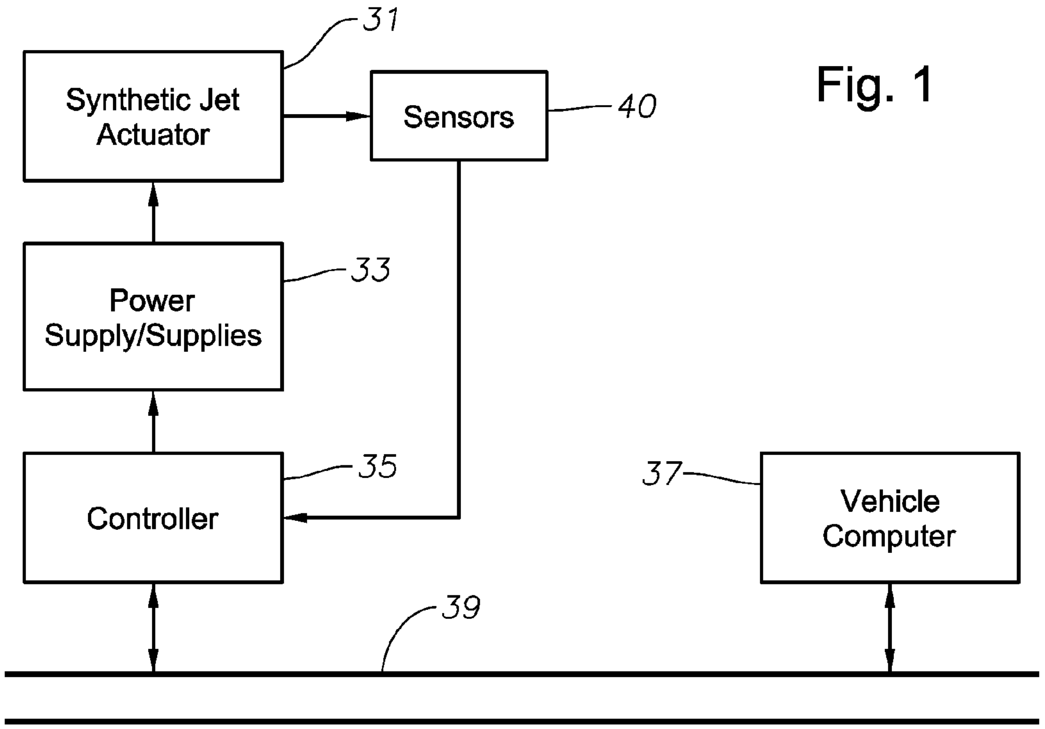
FIG. 1 is a schematic diagram of a general system architecture of a synthetic jet actuator system for controlling fluid flow according to an embodiment of the present invention.

FIG. 1, for example, illustrates an example of a synthetic jet actuator system 30 including at least one, but more typically, multiple distributed synthetic jet actuators 31. A synthetic jet actuator is a device that is configured to inhale and exhale fluid, typically, but nonexclusively, through the same orifice. When implemented to provide global flow-field control, such as, for example, when implemented to control fluid flow across an airfoil, the system 30 generally includes a plurality of synthetic jet actuators 31, a plurality of power supplies 33 to provide actuation of the synthetic jet actuators 31, at least one, but more typically, multiple controllers 35 each in communication with at least one, but more typically, multiple complementary synthetic jet actuators 31 to control a voltage potential being applied to one or more portions of the respective synthetic jet actuators 31, typically through control of the associated power supplies 33. The system 30 can also include a vehicle (e.g., flight) computer 37 in communication with the one or more controllers 35 through one or more vehicle (e.g., aircraft) buses 39 as known to those of ordinary skill in the art. The system 30 can also include one or more sensors 40, a typically for each synthetic jet actuator 31, to provide feedback to an associated power supply 33, an associated controller 35, and/or the vehicle computer 37 to provide various feedback parameters.

Figure 2:
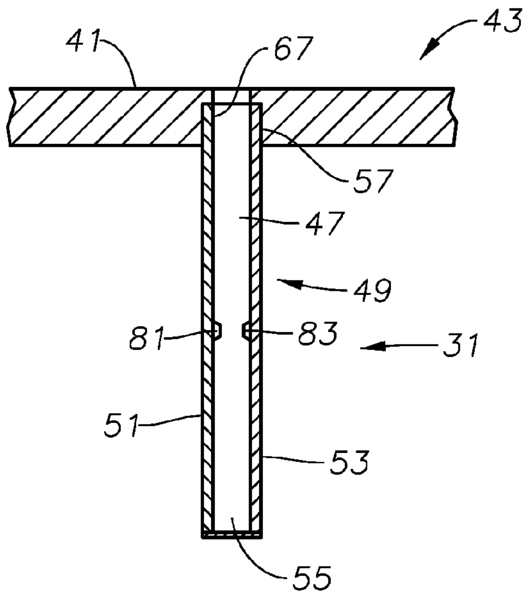
FIG. 2 is a partial environmental view and sectional diagram of a synthetic jet actuator according to an embodiment of the present invention.

FIG. 2 illustrates a partial environmental view of an example of a synthetic jet actuator 31 connected to a portion of an outer surface 41 of, e.g., an airfoil 43. Indicator 47 illustrates a cavity 47 of a fluid chamber 49 which receives and expels fluid. Indicators 51, 53, which "sandwich" cavity 47 illustrate a pair of opposing walls 51, 53, which can be circular (plate-like), rectangular, or some other shape as known to those of ordinary skill in the art, which together form the sides of the fluid chamber 49 in the form of a diaphragm, e.g., hinged or fixedly held at both ends 55, 57, to provide for receiving and expelling fluid, for example, via an oscillatory motion or other relative movement established between the sidewalls 51, 53.

Figure 3:
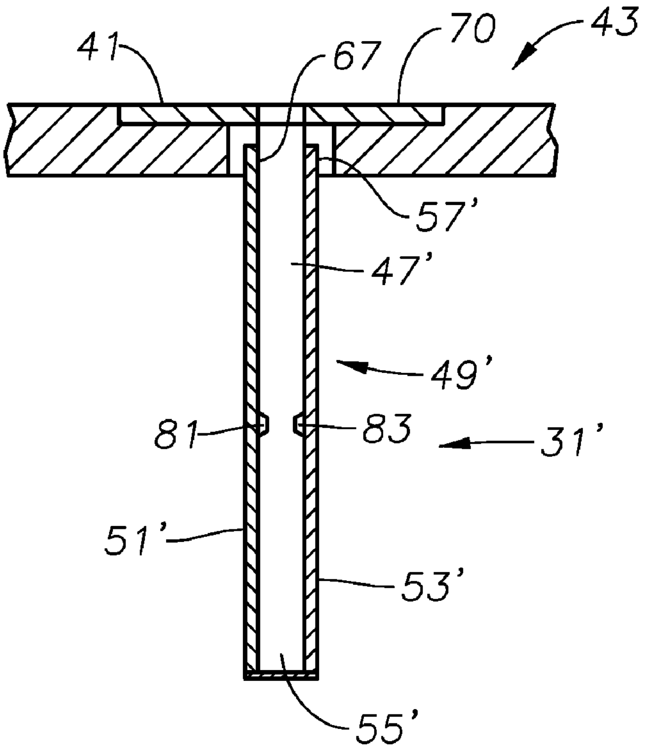
FIG. 3 is a partial environmental view and sectional diagram of a synthetic jet actuator according to an embodiment of the present invention.

Similarly, FIG. 3 illustrates a partial environmental view of another example of a synthetic jet actuator 31' connected to an outer surface 41 of, e.g., airfoil 43. Similar to the synthetic jet actuator 31 shown in FIG. 2, indicator 47' illustrates a cavity of a fluid chamber 49' which receives and expels fluid, and indicators 51', 53', illustrate a pair of opposing side walls 51', 53', each comprising a cantilever as known to those of ordinary skill in the art, which together form the sides of a diaphragm hinged or fixedly held at one end 55' and free at the other end 57' to provide for receiving and expelling fluid, for example, via an oscillatory motion or other relative movement established between the sidewalls 51', 53'.

Figure 4:
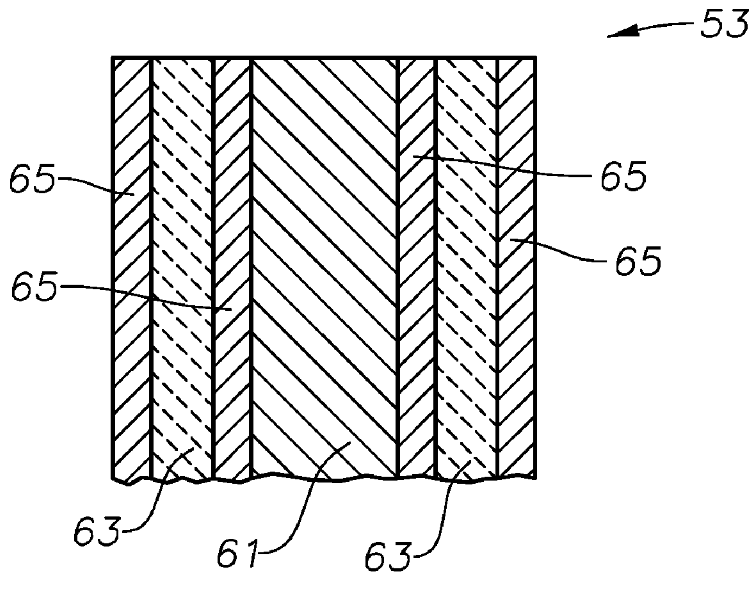
FIG. 4 is a schematic diagram of a wall of a synthetic jet actuator including a bimorph according to an embodiment of the present invention.

FIG. 4 illustrates an exemplary configuration of a cross-section of wall 53, which has a same cross-section as walls 51, 51', and 53' according to the illustrated embodiments of the system 30. When configured in the form of a bimorph as illustrated in FIG. 4, wall 53 includes a central layer typically referred to as a shim 61 positioned between a pair of piezoelectric material layers 63, e.g., each sandwiched between a separate pair of claddings 65. Note, the bimorph portion of the walls 51, 51', 53, 53' comprise the two piezoelectric layers 63 positioned on either side of the shim 61. The material forming the shim 61 and the thickness of the shim 61 can be selected to provide sufficient stiffness to place the operating frequency of the synthetic jet actuator 31, 31', in a user-desired operational range. In the exemplary configuration, for each of the piezoelectric layers 63, an adhesive layer (not shown) adhesively connects the shim 61 to one of the pair of claddings 65, which are both connected on either side of the respective piezoelectric layer 63.

The claddings 65, for example, made from a thin steel sheet or other flexible conductive material in the exemplary configuration, can provide for both protecting the associated piezoelectric layer 63 from cracking and can provide for distributing a different preselected voltage to either side of the respective piezoelectric layer 63 of the pair of piezoelectric layers 63 to form an electrical potential needed to cause a contraction or expansion of the piezoelectric layer 63 depending upon the relative polarity of the applied voltage.

In the dual bimorph configuration, each wall 51, 51', 53, 53' can be separately subjected to a voltage potential such that each piezoelectric layer 63 will either contract or expand depending upon the polarity of the voltage potential. For example, one of the pair of piezoelectric layers 63 for each wall 51, 51', 53, 53', can be electrically made to contract while the other of the pair is made to expand, enhancing deflection of the respective wall 51, 51', 53, 53', the magnitude of which generally depends upon the distance between the respective piezoelectric layer 63 and the central portion of the shim 61, the material composition and thickness of the shim 61, and the voltage applied across the piezoelectric layer 63. Further, as perhaps best shown in FIGS. 5A-5C, the walls 51, 53, (and walls 51', 53') can function in unison to maximize fluid movement, for example, through timed application of a changing, e.g., oscillatory, voltage to the piezoelectric layers 63.

Figure 5D:
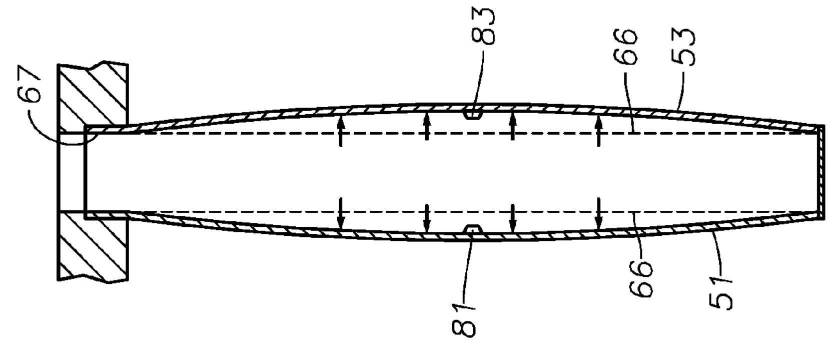
FIGS. 5A-5D are schematic diagrams illustrating operation of a dual bimorph subsystem of the synthetic jet actuator of FIG. 2 without arc formation between electrodes according to an embodiment of the present invention.
Figure 5C:
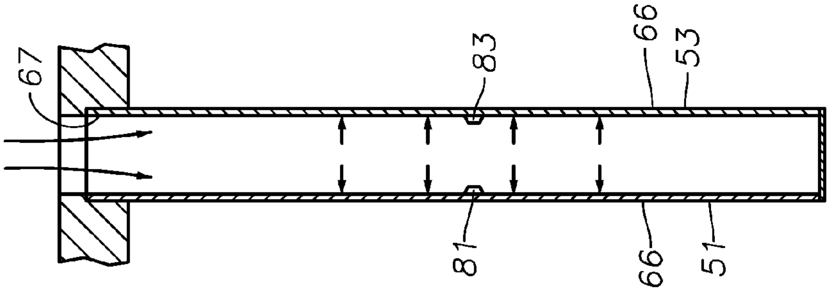
Figure 5B:
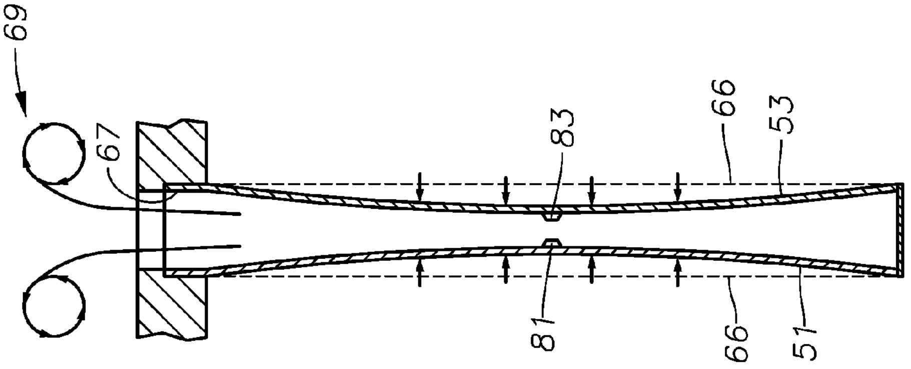
Figure 5A:
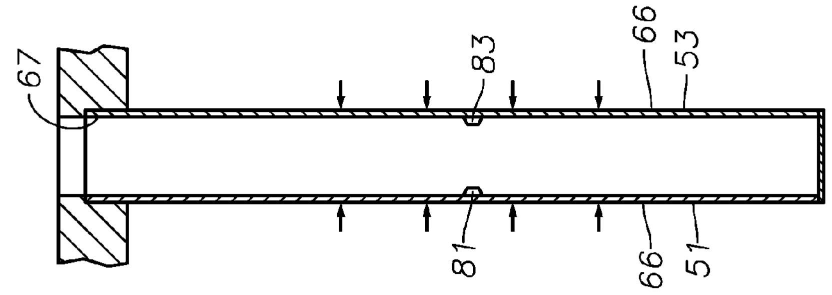

FIGS. 5A-5B illustrate such combined actuation of the synthetic jet actuator 31 illustrated in FIG. 2 resulting from application of a different voltage potential over the piezoelectric material layers 63 of each of the walls 51, 53, forming chamber 49. In the illustrated operation, as the walls 51, 53, of the chamber 49 move toward the chamber center from the undeflected position shown at 66, the chamber volume decreases and fluid is ejected from the chamber 49 through orifice 67. According to the illustrated implementation, as the fluid passes through the orifice 67, the flow separates at the sharp edges of the orifice 67 and creates vortex sheets which roll up into vortices 69. These vortices 69 move away from the edges of the orifice 67 under their own self-induced velocity. As the vortices 69 travel away from the orifice 67, the vortices 69 synthesize a jet of fluid, i.e., a "synthetic jet," through entrainment of the ambient fluid passing over the airfoil 43.

As shown in FIG. 5C, as the walls 51, 53, of the chamber 49 move outward with respect to the chamber center in response to a removal or relaxing of the voltage potential, the chamber volume is increased and ambient fluid is drawn from large distances through the orifice 67 and into the chamber 49. Since the vortices 69 are generally already removed from the edges of the orifice 67, they are typically not affected by the ambient fluid being drawn back into the chamber 49, although the chamber 49 can be equipped with one or more valves (not shown) to allow additional fluid to enter the chamber 49 from an alternative source/location. Note, co-pending U.S. patent application Ser. No. 11/508,469, titled "High-performance Synthetic Valve/Pulsator, provides additional discussion of how synthetic jet actuators can be employed to create vortices used to enhance flow control.

FIG. 5D illustrates a reversal in polarity of the voltage potential, rather than a mere removal or relaxing of such potential according to an alternative voltage application which results in a deflection beyond the undeflected position 66.

Note, although described with respect to a single synthetic jet actuator 31, it should be understood that to control fluid flow for an entire airfoil 43, the system 30 would be configured with multiple complementarily positioned synthetic jet actuators 31 to provide individual micro-flow control that results in a macro-flow effect. Note also, although described with respect to the synthetic jet actuator 31 shown in FIG. 2 having walls 51, 53, which have a point of maximum deflection typically located at or near a midpoint between ends 55, 57, the synthetic jet actuator 31' shown in FIG. 3 having walls 51', 53', employed in the form of a pair of cantilevers can perform similarly with just a few modifications. For example, in order to help control inward and outward fluid velocity, various forms of orifice plate or plates 70 can be positioned adjacent ends 57' of the walls 51', 53'. Examples of suitable orifice plates 70 and their employment can be found, for example, in co-owned U.S. Pat. No. 6,722,581, titled "Synthetic Jet Actuators."

Beneficially, both configurations of synthetic jet actuator 31 employing only the traditional diaphragm or cantilevered diaphragm modes can be especially well-suited where low, medium, and/or moderately high jet velocities and/or fine flow control is desired. In order to obtain enhanced pressure performance, such as, for example, an incrementally increased pressure capability and jet velocity and/or an increased initial rise time of mass flow, such as, for example, where a large flow disruption or near instantaneous response is needed, the system 30 can include at least one pair of electrodes or clusters of electrodes 81, 83, positioned on inner surfaces of the chamber 49 of the synthetic jet actuator 31, 31'. Using the synthetic jet actuator 31 shown in FIG. 2, for exemplary purposes, electrodes 81, 83, are connected to or otherwise interfaced with the inner chamber surface of walls 51, 53, generally on complementary positions so that the electrodes 81, 83, are sufficiently opposingly adjacent to provide for formation of an arc 71 therebetween when subjected to a minimum required electrical potential, at a certain minimum gap distance between electrodes 81, 83, which is/are generally selected based upon expected properties of ambient fluid in the chamber 49 during operational conditions to enhance fluid expulsion from the chamber 49 when enhanced expulsion is desired.

In basic operation, according to a first implementation, the electrodes 81, 83, produce an electrical discharge to heat the fluid within the chamber 49, which causes the fluid in the chamber 49 to accelerate out of the orifice 67. Specifically, the electrical discharge causes rapid heating of the fluid in the chamber 39, which results in a rapid fluid expansion of the fluid and increased pressure within the chamber 49, which is relieved by the exhaustion of the heated fluid through the orifice 67. The additional fluid expelled through the orifice 67 over that of the fluid expelled due to actuation of the walls 51, 53 (i.e., piezoelectric layers 63) is returned to the chamber 49 through a corresponding decrease in pressure caused by cooling of: the walls 51, 53 of the chamber 49, the other heated structural portions of the chamber 49, and the fluid remaining within the chamber 49, upon removal of the critical voltage potential (differential) between electrodes 81, 83. Beneficially, the amount of pressure developed and mass flow generated during each arc discharge-recovery cycle can be greater than that provided solely by use of dual bimorph synthetic jet actuators, and correspondingly, the dual bimorph portion of the synthetic jet 31. Such increase in pressure/mass flow capability caused by the heating gases within the chamber 39 can be utilized to enhance and extend the range of primary flow control, and thus, the performance of an airfoil 43 utilizing the synthetic jet actuators 31 according to various embodiments of the present invention. This is particularly the case where high jet velocities and large flow disruption are desired, such as, for example, when employed in/on an airfoil 43 associated with an aircraft expected to experience conditions such as, for example, slow speed flight, aerobatic flight, and/or during various environmental flow disruptions such as, for example, moderate to extreme turbulence, etc., just to name a few.

Figures 6A, 6B, 6C, 6D:
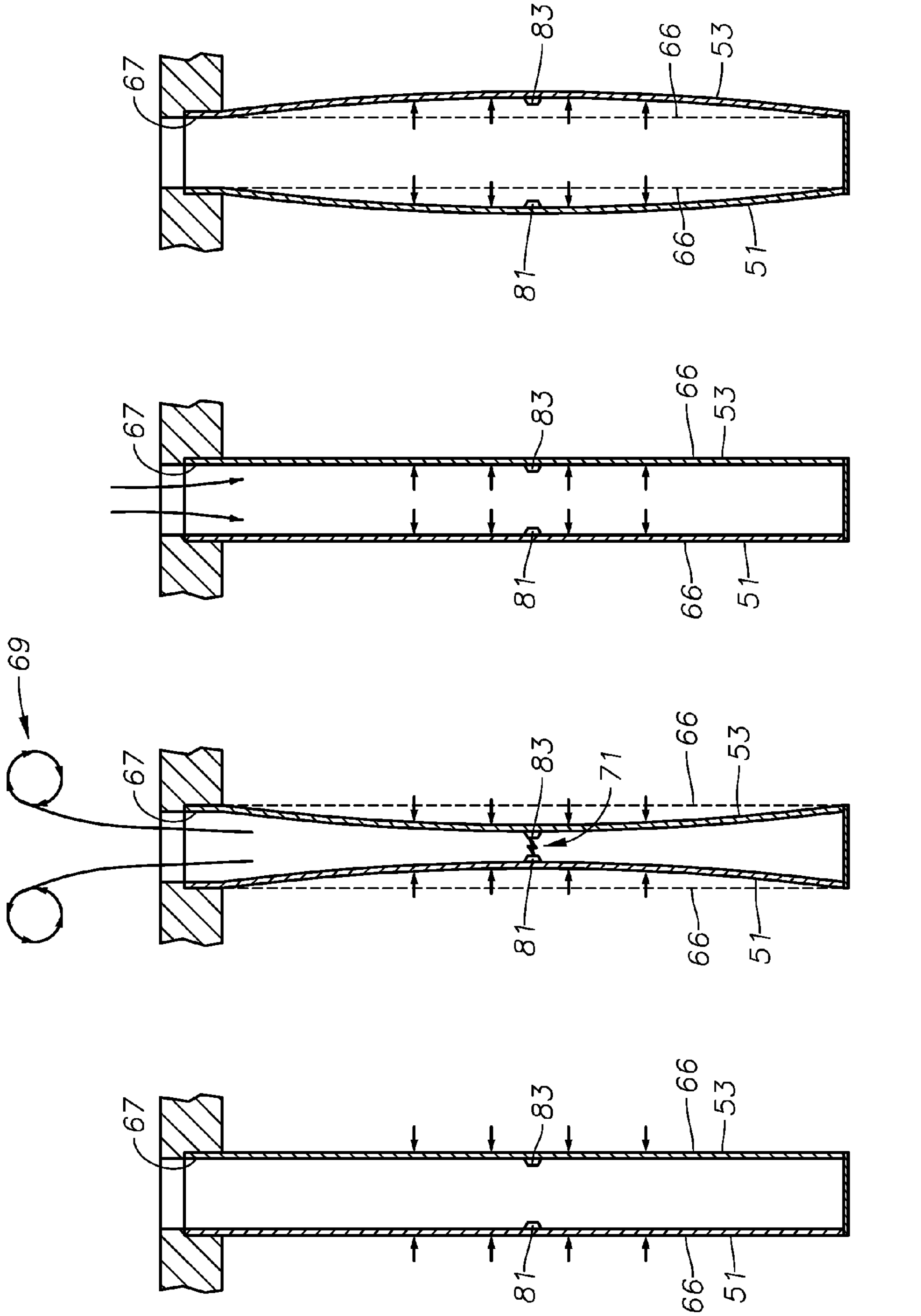
FIGS. 6A-6D are schematic diagrams illustrating operation of both the dual bimorph and arc-forming subsystems of the synthetic jet actuator of FIG. 2 showing arc formation between electrodes according to an embodiment of the present invention.

FIGS. 6A-6B illustrate the combined actuation of the dual bimorph portion of the synthetic jet actuator 31 illustrated in FIGS. 5A-5B (resulting from application of a different voltage potential over the piezoelectric material layers 63 of each of the walls 51, 53 of the synthetic jet actuator 31) in conjunction with an automated or user/computer controlled actuation/activation of the electrodes 81, 83. In the illustrated operation, as the walls 51, 53, of the chamber 49 move toward the chamber center from the undeflected position shown at 66, the chamber volume decreases and fluid is ejected from the chamber 49 through orifice 67. Additionally, an offset voltage potential can be applied to the electrodes 81, 83, which can trigger formation of the arc 71, which results in a rapid fluid expansion and increased mass flow through the orifice 67.

As shown in FIG. 6C, as the walls 51, 53, of the chamber 49 move outward with respect to the chamber center in response to a removal or relaxing of the voltage potential, the electrical discharge forming the arc is interrupted and the chamber volume is increased and ambient fluid is drawn through the orifice 67 and into the chamber 49, either due to resiliency in the walls 51, 53, or, due to a reversal in voltage potential resulting in a reversal of the contraction/expansion of the respective piezoelectric layers 63. FIG. 6D illustrates an example whereby the walls 51, 53, are deflected due to a reversal in polarity of the voltage potential, rather than a mere removal or relaxing of such potential.

Examples of the synchronized operation of the electrodes 81, 83, in conjunction with the dual bimorph portion of the synthetic jet actuator 31 can include engaging the electrodes 81, 83, prior to contraction of the walls 51, 53, 51', 53', activating the electrodes 81, 83, during contraction of walls 51, 53, 51', 53', or activating the electrodes 81, 83, when the walls 51, 53, 51', 53', are at or near their minimum contracted position to extend the duty cycle of the synthetic jet actuator 31, 31', without reducing mass flow.

Figure 7:
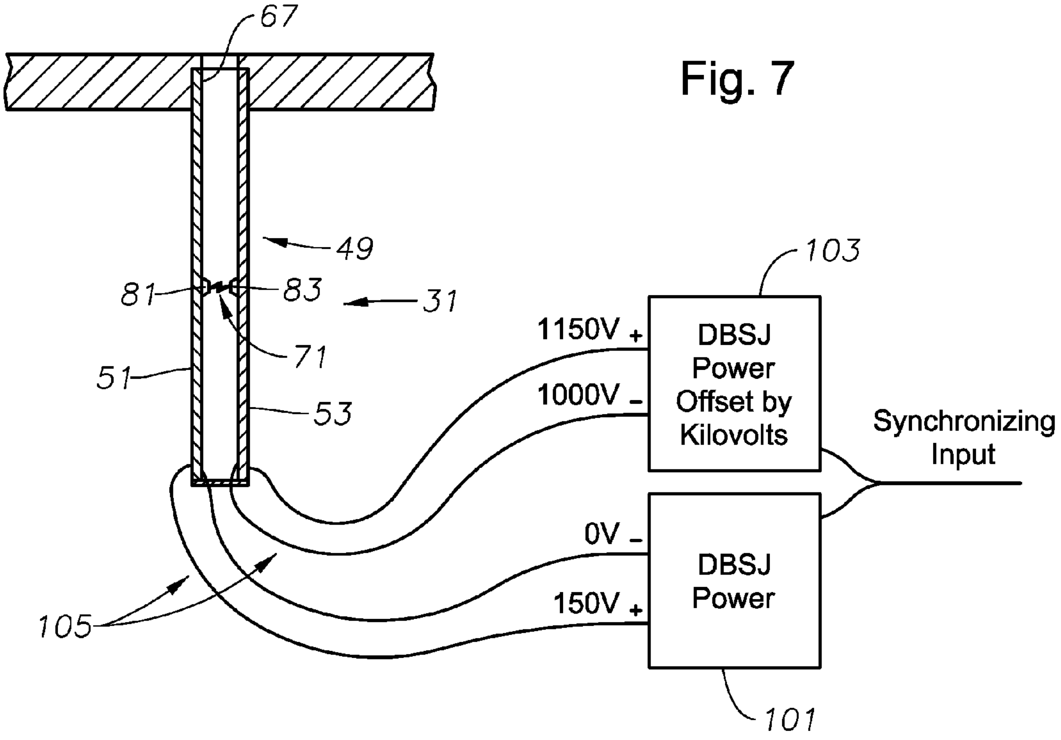
FIG. 7 is a schematic diagram of a synthetic jet actuator system and partial environmental view and sectional view of the synthetic jet actuator of FIG. 2 illustrating a power supply configuration to perform synchronized operation of the dual bimorph and arc-forming subsystems of the synthetic jet actuator according to an embodiment of the present invention.
Figure 8:
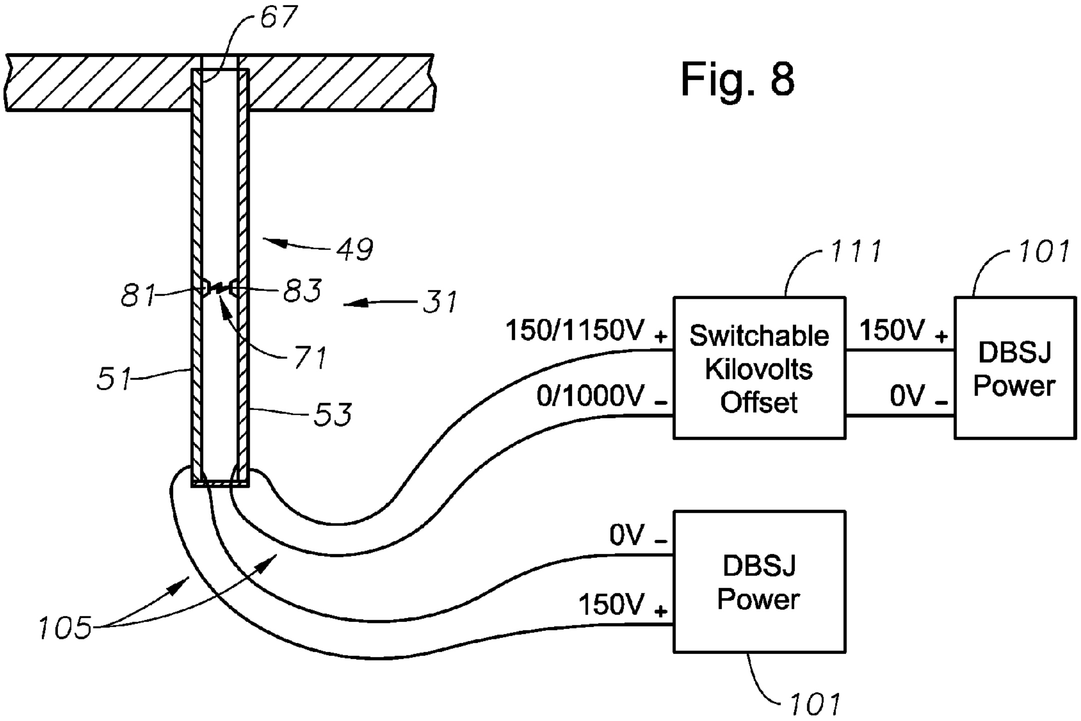
FIG. 8 is a schematic diagram of a synthetic jet actuator system and partial environmental view and sectional view of the synthetic jet actuator of FIG. 2 illustrating a power supply configuration to perform synchronized operation of the dual bimorph and arc-forming subsystems of the synthetic jet actuator according to an embodiment of the present invention.

FIGS. 7 and 8 illustrate two embodiments of the present invention which employ synchronized operation of the electrodes 81, 83, in conjunction with the dual bimorph portion (subsystem) of the synthetic jet actuator 31 illustrated in FIG. 2, whereby the electrodes 81, 83, are in electrical communication with the walls 51, 53, which are, in turn, are powered at different voltage pairs so that the electrical potential between opposing walls 51, 53, 51', 53', is, e.g., in the kilovolt range.

FIG. 7, for example, illustrates a pair of dual bimorph synthetic jet power supplies 101, 103, in electrical communication with the synthetic jet actuator 31 via conductors 105, and in communication with a synchronizing input, for example, provided by a synchronizer or controller 35 positioned either external to the power supplies 101, 103, or located internally within to one of the power supplies 101, 103. In this illustration, power supply 101 provides power to the internal piezoelectric layers 63 within wall 51 sufficient to actuate contraction/expansion of the layers 63, and power supply 103 provides power to the internal piezoelectric layers 63 within wall 53 sufficient to actuate the contraction/expansion of the layers 63 to form a synthetic jet.

Specifically, in the illustration, the negative terminal of wall 51 of the pair of opposing walls 51, 53, is set at a base voltage of, e.g., 0 V, with the positive terminal of the wall 51 periodically being set at, e.g., 150 V, by power supply 101 to provide an, e.g., 150 V, voltage potential across the respective piezoelectric layers 63 during actuation of the dual bimorph portion of the wall 51, and the negative terminal of the other opposing wall 53 of the pair is set at a base voltage of, e.g., 1000 V, with the positive terminal of the wall 53 periodically set at, e.g., 1150 V, by power supply 103 in sync with the provision of 150 volts to the positive terminal of the wall 51 to provide a similar 150 V voltage potential across the respective piezoelectric layers 63 of the wall 53 during actuation of the dual bimorph portion of the wall 53, to thereby provide power for synchronous operation of the dual bimorph portions of the synthetic jet actuator 31.

In this voltage configuration, the potential between negative terminals of 1000 V is set to provide power for automatic operation of the arc-forming portion of the synthetic jet actuator 31, such that the arc forming portion of the synthetic jet actuator 31 is automatically activated during the synchronized contraction of the bimorph portion of the synthetic jet actuator 31 which results in the arc 71 passing through a portion of the chamber 49 causing heating of the localized gases therein, which causes expansion of the gases, which increases the exit velocity of the exiting synthetic jet. Specifically, due to the, e.g., 1000 V, potential between negative terminals, as the walls 51, 53, move toward the chamber center, the distance (gap) between electrodes 81, 83, decreases to a certain gap size so that the offset potential between electrodes 81, 83, begins to break down the fluid within the chamber 49, triggering the formation of arc 71, which results in a rapid fluid expansion and increased mass flow through the orifice 67.

Note, the base voltages of the negative terminals of the walls 51, 53, are provided by way of example only. Other voltages providing other appropriate offset potentials are within the scope of the present invention. Note also, the illustration assumes a negatively grounded system. Other polarity configurations are also within the scope of the present invention. Note further, the "certain gap size" can be the gap size associated with the undeflected position of the walls 51, 53, for example, in cases where the walls 51, 53, oscillate to an extended position such as that shown in FIG. 6D. Additionally, it should be understood that the conductors 105 can include multi-wire electrical conductors, optical conductors having electro-optical converters, etc., as known to those of ordinary skill and the art. Further, it should be understood that the dual bimorph portion of the synthetic jet actuator 31 is not limited to two-terminal configurations. Still further, it should be understood that the above and below description of the power systems apply equally to applications with the other embodiments of the synthetic jet actuator such as, for example, synthetic jet actuator 31' illustrated in FIG. 3.

FIG. 8, or example, illustrates a pair of dual bimorph synthetic jet power supplies 101, 101', operating with a switchable kilovolt offset power supply 111 positioned to provide for selective activation of the arc-forming portion of the synthetic jet actuator 31 in response to a control signal generated, for example, by a feedback control circuit including controller 35 in communication with sensors 40 (FIG. 1), which can activate the provision of the addition of an offset voltage when the dual bimorph portion of the synthetic jet 31 is found to be insufficient, and/or by selective provision of the addition of an offset voltage by other means such as, for example, a control circuit including the controller 35 in communication with the vehicle computer 37 and/or in communication with sensors 40 as an anticipatory action when it is determined that the additional velocity/mass flow provided by activation of the arc-forming portion of the synthetic jet actuator 31 is, or would be, required or desirable.

Specifically, in this illustration, power supply 101 provides the negative terminal of wall 51 a base voltage of, e.g., 0 V, with the positive terminal of the wall 51 periodically being set at, e.g., 150 V, to provide an, e.g., 150 V, voltage potential across the respective piezoelectric layers 63 during actuation of the dual bimorph portion of the wall 51, and power supply 101', through kilovolt offset power supply 111, provides the negative terminal of opposing wall 53 a similar base voltage of, e.g., 0 V, with the positive terminal of the wall 53 periodically being set at, e.g., 150 V, to provide an, e.g., 150 V, voltage potential across the respective piezoelectric layers 63 during actuation of the dual bimorph portion of the wall 51. In this configuration, however, in response to a control or feedback signal, the negative terminal of the opposing wall 53 can be switchably increased to a base voltage of, e.g., 1000 V, by switchable kilovolt offset power supply 111, which results in a relative increase in potential across the electrodes 81, 83, of the 1000 V, enabling operation of the arc-forming portion of the synthetic jet actuator 31.

In a preferred configuration, the switchable kilovolt offset power supply 111 includes a circuit portion which can add the 1000 V offset voltage in series with the 150 V voltage potential provided by the power supply 101' to provide the 1000 volts to the negative terminal of the wall 53 and to provide a relative increase in voltage to the positive terminal of the wall 53 such that the positive terminal of the wall 53 is periodically set at, e.g., 1500 V, in sync with the provision of 150 volts to the positive terminal of the wall 51 to provide a similar 150 V voltage potential across respective piezoelectric layers 63 of the wall 53 during actuation of the dual bimorph portion of the wall 53, to thereby provide power for synchronous operation of the dual bimorph portions of the synthetic jet actuator 31. Note, in an alternative configuration, rather than employing power supply 101', separately, a single synthetic jet power supply 101 can be both utilized to provide voltage potential to wall 51 directly and to wall 53 through the switchable kilovolt offset power supply 111.

In the exemplary embodiment of the present invention of FIG. 8, the voltage offset, electrode configuration, and chamber configuration are selected so that the "gap size" needed to result in development of the arc 71 is generally set to have a certain value or range of values between the "between-electrodes" gap distance existing when both walls 51, 53, are fully inwardly deflected toward their inward-most position within the cavity 49 and the "between-electrodes" gap distance existing when both walls are in their undeflected position 66. If, for example, such "break down" distance is the "between-electrodes" distance at or near the undeflected position, the additional mass flow assistance provided by the arcing and associated heating can be initiated as early as just prior to movement of the dual bimorph portion of the synthetic jet actuator 31 to enhance providing a maximum exit velocity to the fluid contained within the chamber 49. If, for example, such "break down" distance is at or near the fully inwardly deflected position, the additional mass flow assistance can be initiated to extend the duration of the mass flow stream and can be initiated anywhere between prior to movement of the dual bimorph portion of the synthetic jet actuator 31 and near full inward deflection to provide up to the maximum potential amount of time for the system 30 to determine that additional assistance from the arc-forming portion of the synthetic jet actuator 31 is needed. A "break down" distance between the two extremes can be selected to enhance the trade-off between the benefits provided by the extreme cases.

One or more sensors 40 for each synthetic jet actuator 31 can be positioned to provide pressure, velocity, temperature, momentum, environmental flow measurements, and/or wall position feedback directly to the switchable kilovolt offset power supply 111 configured with a controller similar to controller 35, or indirectly through external controller 35 in communication therewith and/or indirectly via communication with the vehicle computer 37 to provide various feedback parameters.

Figure 9:
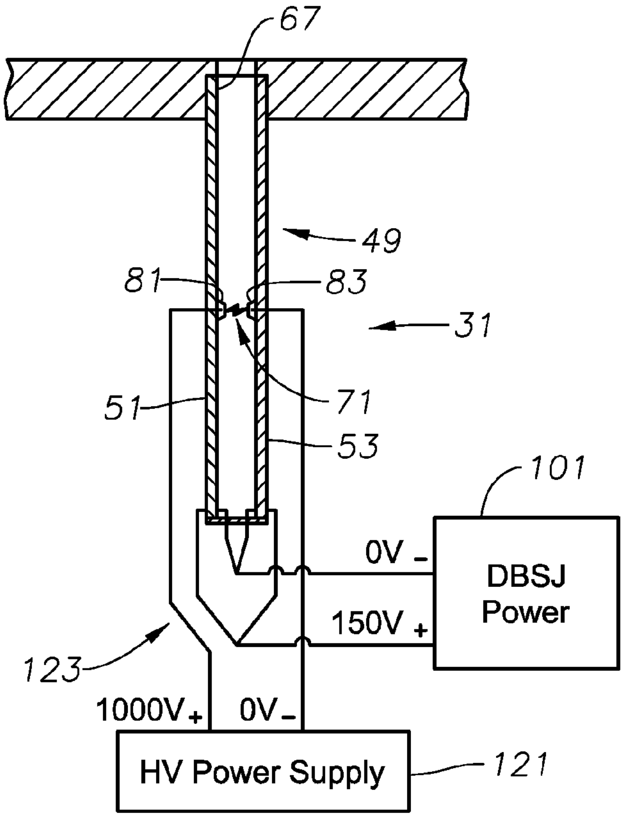
FIG. 9 is a schematic diagram of a synthetic jet actuator system and partial environmental view and sectional view of the synthetic jet actuator of FIG. 2 illustrating a power supply configuration to perform independent synchronized operation of the dual bimorph and arc-forming subsystems of the synthetic jet actuator according to an embodiment of the present invention.
Figure 10:
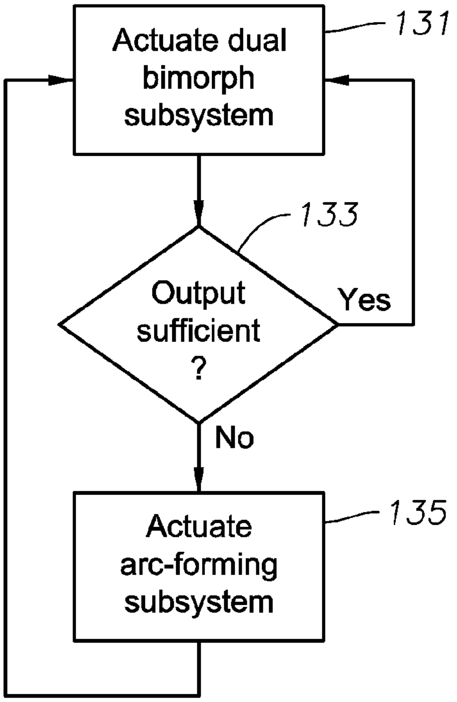
FIG. 10 is a schematic block flow diagram illustrating steps associated with performing synchronized operation of dual bimorph subsystem components and arc-forming components of a synthetic jet actuator according to an embodiment of the present invention.

FIG. 9 illustrates an embodiment of the present invention which employs both independent and synchronized operation of the arc-forming subsystem and the dual bimorph subsystem of the synthetic jet actuator 31 shown in FIG. 2. Specifically, in this configuration, the arc-forming subsystem and the dual bimorph subsystem of the synthetic jet actuator 31 are physically connected but electrically independent to enhance separate management of the two subsystems. For example, a dual bimorph synthetic jet power supply 101 can be independently connected to the dual bimorph subsystem to provide a voltage potential across both the negative and positive terminals of both opposing walls 51, 53, to provide locked-in synchronized control. Similarly, a high-voltage power supply 121 can be connected directly to the electrodes 81, 83, for example, using an independent set of conductors 123.

Beneficially, the illustrated configuration allows for selective operation of the arc-forming subsystem of the synthetic jet actuator 31 in the absence of operation of the dual bimorph subsystem of the synthetic jet actuator 31, selective operation of the dual bimorph subsystem of the synthetic jet actuator 31 in the absence of operation of the arc-forming subsystem of the synthetic jet actuator 31, and selective operation of both subsystems simultaneously, to maximize the characteristics of the individual subsystems and/or to provide maximum performance available through combined operation of both subsystems.

In a preferred configuration, a control circuit including, for example, controller 35 and/or vehicle computer 37, in communication with sensors 40 (FIG. 1) and/or other aircraft/vehicle sensors (not shown) is configured to detect or determine current operational parameters to thereby determine whether low, medium, high, or very high jet velocities and/or whether moderate or enhanced flow control response is desired which may be best provided by the dual bimorph subsystem of the synthetic jet actuator 31, by the arc-forming subsystem, or by the combined features provided by simultaneous operation such as, for example, to extend the performance or operating margin of the dual bimorph subsystem of the synthetic jet actuator 31, as described above.

Various embodiment of the present invention include methods for controlling fluid flow utilizing one or more embodiments of a synthetic jet actuator 31, 31', and associated system components, described above. For example, a method of controlling fluid flow according to an exemplary embodiment of the present invention includes the steps of actuating a pair of opposing walls 51, 53, or 51', 53', (block 131) each including a bimorph which together form a dual bimorph configured to contract inwardly to expel a fluid from within a chamber 49, 49' formed at least partially by the wall 51, 53, or 51', 53', to thereby provide flow control to an environmental flow. The method also includes the steps of detecting insufficient output from actuation of the walls 51, 53, or 51', 53' and/or receiving control signals indicating a desired level of fluid expulsion from the chamber 49, 49', exceeding that capable of being provided by actuation of the walls 51, 53, or 51', 53' (block 133), and responsively forming an arc 71 between a pair of opposing electrodes 81, 83, each connected to an inner surface of a separate one of the walls 51, 53, or 51', 53' (block 135) to enhance expulsion of the fluid from within the chamber 49, 49', preferably to at least a desired minimum level.

According to an embodiment of the method, the step of forming an arc 71 includes the steps of applying to the bimorph of the first wall 51, 51', a first voltage potential of, for example, 150 V having a base (e.g., negative terminal) voltage of 0 V, and applying to the bimorph of the second wall 53, 53', a second voltage potential of, for example, 150 V, but having an offset base voltage of, for example, 1000 V to form a voltage potential of 1000 V between electrodes 81, 83. Application of this 1000 V voltage potential functions to cause the fluid within the chamber 49, 49' to break down, and thus, result in the arc formation, once the walls 51, 53, or 51', 53' have contracted sufficiently inwardly to a point where the distance between the inner surface of the walls 51, 53, or 51', 53' reaches a certain critical gap distance (based on the type of fluid within the chamber 49, 49').

According to another embodiment of the method, the step of forming an arc 71 includes the steps of applying to the bimorph of the first wall 51, 51', a first voltage potential of, for example, 150 V having a base voltage of 0 V, applying to the bimorph of the second wall 53, 53', a second voltage potential of, for example, 150 V also having a base voltage of 0 V, and switchably providing to the bimorph of the second wall 53, 53', a third voltage potential of, for example, 150 V but having an offset base voltage of, for example, 1000 V to form a voltage potential of 1000 V between electrodes 81, 83, to cause the fluid within the chamber 49, 49', to break down.

According to a preferred configuration, the step of switchably providing the third voltage potential to the bimorph of the second wall 53, 53', includes causing a power supply such as, for example, switchable kilovolt offset power supply 111, to switch from using a base voltage of 0 V to using a base voltage of 1000 V, for example, in response to detecting insufficient output from the synthetic jet actuator 31, 31', and/or receiving control signals indicating a desired level of fluid expulsion from the chamber 49, 49', to thereby selectively form the arc 71 between the first and the second electrodes 81, 83. As described above, formation of the arc 71 results in a heating of the fluid within the chamber 49, 49', and the ensuing expansion of the fluid to thereby enhance expulsion of the fluid from within the chamber 49, 49', effectively extending the performance or operating margin of the dual bimorph subsystem portion of the synthetic jet actuator 31, 31'.

According to another embodiment of the present invention, the step of actuating the pair of opposing walls 51, 53, or 51', 53' to contract inwardly toward the center of the chamber 49, 49', includes the step of applying a voltage potential of, for example, 150 V to both the bimorph of the first wall 51, 51', and to the bimorph of the second wall 53, 53', to expel the fluid from within the chamber 49, 49'. Correspondingly, the step of forming an arc 71 includes the step of applying to the pair of electrodes 81, 83, a voltage potential of, for example, 1000 V or other voltage potential sufficient to cause the fluid within the chamber 49, 49', to break down to enhance expulsion of the fluid within the chamber 49, 49', in response to detecting insufficient output from the synthetic jet actuator 31, 31', and/or receiving control signals indicating a desired level of fluid expulsion from the chamber 49, 49', to extend the performance or operating margin of the dual bimorph subsystem portion of the synthetic jet actuator 31, 31'.

It is important to note that while various embodiments of the present invention have been described in the context of a fully functional system, those skilled in the art will appreciate that the mechanism of at least portions of the present invention and/or aspects thereof are capable of being distributed in the form of a computer readable medium embodying instructions in a variety of forms such as, for example, software, program product or firmware, etc., associated with controller 35 and/or vehicle computer 37, for execution on a processor, processors, or the like, such as those associated with controller 35 or vehicle computer 37, and that embodiments of the present invention apply equally regardless of the particular type of signal bearing media used to actually carry out the distribution. Examples of computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, HD-DVDs, memory sticks, mini disks, laser disks, Blu-ray disks, flash drives, and other newer types of memories, and in certain circumstances, at least portions of transmission type media such as digital and analog communication links capable of storing the instructions. Such media can include, for example, both operating instructions and operations instructions related to the functions of controller 35 and computer 37, the computer implementable portions of the method steps, described above.

Various embodiments of the present invention provide several advantages. For example, various embodiments of the present invention advantageously provide flow control systems, apparatus, devices, controllers, associated program product/firmware, and methods which provide both the pressure performance capacity and fine flow control of a dual bimorph synthetic jet actuator and the high-performance capacity of a spark jet. Various embodiments of the present invention also provide flow control systems, apparatus, devices, controllers, associated program product/firmware, and methods which utilize the concepts of a spark jet automatically and/or under user control to selectively enhance performance of a synthetic jet actuator employing the concepts of a dual bimorph synthetic jet when maximum performance is desired. Advantageously, various embodiments of the present invention extend the upper performance limit of a synthetic jet actuator employing dual bimorph components through insertion of a controllable electrical arc into the dual bimorph synthetic jet cavity to provide heating of the fluid therein, which raises the exit velocity of the fluid contained within the cavity, thus extending the performance envelope of the actuator, up to and beyond the individual capabilities of either a dual bimorph synthetic jet actuator or a spark jet. Various embodiments of the present invention also advantageously provide the components needed to upgrade the dual bimorph synthetic jet actuator described in U.S. Pat. No. 6,722,581 to provide for improved application in transonic speed applications, and to further enhance the performance range of the existing dual bimorph synthetic jet actuator, for example, through application of at least two electrodes placed in the interior of the dual bimorph cavity. Various embodiments of the present invention further advantageously provide a synthetic jet actuator having a mass flow with an the initial risetime similar to that of a spark jet but operating at the frequency of a dual bimorph synthetic jet as the frequency is not limited by cooling efficiency of the internal chamber due to the cycling of the dual bimorph. Advantageously, the various embodiments of the present invention can be employed as part of an embedded system to address certain flow control situations where it is desirable to alter an environmental flow, at least at specific times, or under specific conditions, by the use of synthetic jets actuators. The various embodiments of the present invention can be beneficially applied in situations where traditional dual bimorph synthetic jet actuators would require additional performance or operating margin, and/or where additional heat would be desired in the exit flow.

This application is related to co-pending U.S. patent application Ser. No. 11/508,469, filed Aug. 23, 2006, and titled "High-performance Synthetic Valve/Pulsator," and co-owned U.S. Pat. No. 6,722,581, filed Oct. 24, 2001, and titled "Synthetic Jet Actuators," each incorporated by reference in its entirety.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

That claimed is:

1. A synthetic jet actuator system including a synthetic jet actuator comprising:

a first wall including an inner surface, an outer surface, and a piezoelectric layer configured to expand in response to an applied electrical potential;

a second wall including an inner surface, an outer surface, and a piezoelectric layer configured to expand in response to an applied electrical potential;

a chamber extending between the inner surface of the first wall and the inner surface of the second wall, the chamber dimensioned to expel a fluid through an associated orifice responsive to electrical actuation of the first wall resulting in inward movement of at least portions of the first wall toward a center of the chamber and responsive to electrical actuation of the second wall resulting in inward movement of at least portions of the second wall toward the center of the chamber and to receive a fluid responsive to outward movement of the at least portions of the first wall away from the center of the chamber and outward movement of the at least portions of the second wall away from the center of the chamber;

a first electrode connected to the inner surface of the first wall; and a second electrode connected to the inner surface of the second wall and positioned adjacent the first electrode to provide for formation of an arc therebetween when subjected to a minimum electrical potential therebetween to thereby enhance fluid expulsion from the chamber.

2. A synthetic jet actuator system as defined in claim 1, wherein the first wall is a first wall configured to form a first flexible diaphragm; and wherein the second wall is a second wall configured to form a second flexible diaphragm.

3. A synthetic jet actuator system as defined in claim 1, wherein the piezoelectric layer of the first wall is a first piezoelectric layer;

wherein the first wall includes a second piezoelectric layer that together with the first piezoelectric layer in the first wall form a first bimorph;

wherein the piezoelectric layer of the second wall is a first piezoelectric layer; and wherein the second wall includes a second piezoelectric layer that together with the first piezoelectric layer in the second wall form a second bimorph.

4. A synthetic jet actuator system as defined in claim 1, wherein the first wall includes a proximal end, a distal end, and a medial portion extending therebetween, the medial portion having a location of maximum inward deflection when deflected toward the center of the chamber;

wherein at least portions of the first electrode are positioned approximately coincident with the point of maximum inward deflection of the first wall;

wherein the second wall includes a proximal end, a distal end, and a medial portion extending therebetween, the medial portion having a location of maximum inward deflection when deflected toward the center of the chamber; and wherein at least portions of the second electrode are positioned approximately coincident with the point of maximum inward deflection of the second wall.

5. A synthetic jet actuator system defined in claim 1, wherein the first wall is a first wall configured to form a first cantilever; and wherein the second wall is a second wall configured to form a second cantilever.

6. A synthetic jet actuator system as defined in claim 1, wherein the first wall includes a location of maximum inward deflection when deflected toward the center of the chamber;

wherein at least portions of the first electrode are positioned approximately coincident with the point of maximum inward deflection of the first wall;

wherein the second wall includes a location of maximum inward deflection when deflected toward the center of the chamber; and wherein at least portions of the second electrode are positioned approximately coincident with the point of maximum inward deflection of the second wall.

7. A synthetic jet actuator system defined in claim 1, further comprising:

a first power supply electrically connected to the first electrode and electrically connected to the second electrode to provide kilovolt level electrical potential to the first and the second electrodes sufficient to provide the minimum required electrical potential between the first and the second electrodes to break down environmental fluid within the chamber at a between-electrode gap distance at least equal to a distance between the first and the second electrodes when the first and the second walls are actuated to provide maximum inward deflection; and a second power supply electrically connected to the first wall to apply electrical potential to the piezoelectric layer of the first wall to actuate the first wall of the synthetic jet actuator, and electrically connected to the second wall to apply electrical potential to the piezoelectric layer of the second wall to actuate the second wall of the synthetic jet actuator.

8. A synthetic jet actuator system defined in claim 1, wherein the first electrode is positioned in electrical communication with an inner surface of the piezoelectric layer of the first wall;

wherein the second electrode is positioned in electrical communication with an inner surface of the piezoelectric layer of the second wall; and wherein the synthetic jet actuator system further comprises:

a first power supply electrically connected to the first wall to apply electrical potential to the piezoelectric layer of the first wall to actuate the first wall of the synthetic jet actuator, a base voltage of the electrical potential applied to the piezoelectric layer of the first wall also applied to the first electrode, and a second power supply electrically connected to the second wall to apply electrical potential to the piezoelectric layer of the second wall to actuate the second wall of the synthetic jet actuator, a base voltage of the electrical potential applied to the piezoelectric layer of the second wall also applied to the second electrode, a value of the base voltage of the electrical potential of the second power supply having a substantial voltage offset from a value of the base voltage of the electrical potential of the first power supply, the substantial voltage offset sufficient to provide the minimum electrical potential between the first and the second electrodes to break down environmental fluid within the chamber at a between-electrode gap distance at least equal to a distance between the first and the second electrodes when the first and the second walls are actuated to provide maximum inward deflection.

9. A synthetic jet actuator system defined in claim 8, further comprising:

a controller positioned in communication with the first power supply and the second power supply to synchronize piezoelectric actuation of the first and the second walls of the synthetic jet actuator.

10. A synthetic jet actuator system defined in claim 1, wherein the first electrode is positioned in electrical communication with an inner surface of the piezoelectric layer of the first wall;

wherein the second electrode is positioned in electrical communication with an inner surface of the piezoelectric layer of the second wall; and wherein the synthetic jet actuator system further comprises:

a first power supply electrically connected to the first wall to apply electrical potential to the piezoelectric layer of the first wall to actuate the first wall of the synthetic jet actuator, a base voltage of the electrical potential applied to the piezoelectric layer of the first wall also applied to the first electrode, and a second power supply comprising a switchable power supply electrically connected to the piezoelectric layer of the second wall to apply electrical potential to actuate the second wall of the synthetic jet actuator, a base voltage of the electrical potential applied to the piezoelectric layer of the second wall also applied to the second electrode, the second power supply configured to selectively switch between providing:

an electrical potential sufficient to actuate the piezoelectric layer of the second wall and having a first base voltage having a value providing a substantial voltage offset from a value of the base voltage of the electrical potential of the first power supply sufficient to provide for formation of the arc between the first and the second electrodes to enhance fluid expulsion from the chamber, and an electrical potential sufficient to actuate the piezoelectric layer of the second wall and having a second base voltage having a value insufficiently different from the value of the base voltage of the electrical potential applied to the piezoelectric layer of the first wall to provide for the formation of the arc between the first and the second electrodes.

11. A synthetic jet actuator system defined in claim 10, wherein the substantial voltage offset provided by the first base voltage of the electrical potential, applied by the second power supply is sufficient to provide the minimum electrical potential between the first and the second electrodes to break down environmental fluid within the chamber at a between-electrode gap distance at least equal to a distance between the first and the second electrodes when the first wall is actuated by the first power supply to provide maximum inward deflection thereof and the second wall is actuated by the second power supply to provide maximum inward deflection thereof; and wherein the second base voltage of the electrical potential applied by the second power supply is substantially similar to the base voltage of the electrical potential applied by the first power supply to provide a voltage differential therebetween insufficient to provide for formation of the arc between the first and the second electrodes.

12. A synthetic jet actuator system defined in claim 11, further comprising:

a third power supply in electrical communication with the second power supply to provide the second power supply with the electrical potential having the second base voltage.

13. A synthetic jet actuator system defined in claim 11, wherein the second power supply supplies the electrical potential having the second base voltage by default, the system further comprising:

a controller positioned in communication with the second power supply and configured to cause the second power supply to switch the second power supply electrical potential usage from the electrical potential having the second base voltage to the electrical potential having the first base voltage, responsive to detecting insufficient output from the synthetic jet actuator, to form the arc between the first and the second electrodes to thereby enhance fluid expulsion from the chamber.

14. A synthetic jet actuator system defined in claim 11, further comprising:

a controller positioned in communication with the second power supply and a flight control computer of an aircraft and configured to cause the second power supply to switch the second power supply electrical potential usage between the electrical potential having the second base voltage and the electrical potential having the first base voltage responsive to control signals indicating a desired level of fluid expulsion from the chamber.

15. A synthetic jet actuator system including a synthetic jet actuator comprising:

a first wall including an inner surface, an outer surface, and a pair of piezoelectric layers forming a first bimorph;

a second wall including an inner surface, an outer surface, and a pair of piezoelectric layers forming a second bimorph;

a chamber extending between the inner surface of the first wall and the inner surface of the second wall, the chamber dimensioned to expel a fluid through an associated orifice responsive to electrical actuation of the first wall resulting in inward movement of at least portions of the first wall toward a center of the chamber and responsive to electrical actuation of the second wall resulting in inward movement of at least portions of the second wall toward the center of the chamber and, to receive a fluid responsive to outward movement of the at least portions of the first wall away from the center of the chamber and outward movement of the at least portions of the second wall away from the center of the chamber;

a first electrode connected to the inner surface of the first wall; and a second electrode connected to the inner surface of the second wall and positioned adjacent the first electrode to provide for formation of an arc therebetween when subjected to a minimum electrical potential therebetween to thereby enhance fluid expulsion from the chamber.

16. A synthetic jet actuator system as defined in claim 15, wherein the first wall includes a location of maximum inward deflection when deflected toward the center of the chamber;

wherein at least portions of the first electrode are positioned approximately coincident with the point of maximum inward deflection of the first wall;

wherein the second wall includes a location of maximum inward deflection when deflected toward the center of the chamber; and wherein at least portions of the second electrode are positioned approximately coincident with the point of maximum inward deflection of the second wall.

17. A synthetic jet actuator system defined in claim 15, wherein the first electrode is positioned in electrical communication with an inner surface of an innermost one of the pair of piezoelectric layers of the first wall;

wherein the second electrode is positioned in electrical communication with an inner surface of an innermost one of the pair of piezoelectric layers of the second wall; and wherein the synthetic jet actuator system further comprises:

a first power supply electrically connected to the first wall to apply electrical potential to the pair of piezoelectric layers of the first wall to actuate the first wall of the synthetic jet actuator, a base voltage of the electrical potential applied to the innermost one of the pair of piezoelectric layers of the first wall also applied to the first electrode, and a second power supply electrically connected to the second wall to apply electrical potential to the pair of piezoelectric layers of the second wall to actuate the second wall of the synthetic jet actuator, a base voltage of the electrical potential applied to the innermost one of the pair of piezoelectric layers of the second wall also applied to the second electrode, a value of the base voltage of the electrical potential of the second power supply having a substantial voltage offset from a value of the base voltage of the electrical potential of the first power supply, the substantial voltage offset sufficient to provide the minimum electrical potential between the first and the second electrodes to break down environmental fluid within the chamber at a between-electrode gap distance at least equal to a distance between the first and the second electrodes when the first and the second walls are actuated to provide maximum inward deflection.

18. A synthetic jet actuator system defined in claim 15, further comprising:

a first power supply electrically connected to the first electrode and electrically connected to the second electrode to provide kilovolt level electrical potential to the first and the second electrodes sufficient to provide the minimum electrical potential between the first and the second electrodes to break down environmental fluid within the chamber at a between-electrode gap distance at least equal to a distance between the first and the second electrodes when the first and the second walls are actuated to provide maximum inward deflection; and a second power supply electrically connected to the first wall to apply electrical potential to the pair of piezoelectric layers of the first wall to actuate the first wall of the synthetic jet actuator, and electrically connected to the second wall to apply electrical potential to the pair of piezoelectric layers of the second wall to actuate the second wall of the synthetic jet actuator.

19. A synthetic jet actuator system defined in claim 15, wherein the first electrode is positioned in electrical communication with an inner surface of an innermost one of the pair of piezoelectric layers of the first wall;

wherein the second electrode is positioned in electrical communication with an inner surface of an innermost one of the pair of piezoelectric layers of the second wall; and wherein the synthetic jet actuator system further comprises:

a first power supply electrically connected to the first wall to apply electrical potential to the pair of piezoelectric layers of the first wall to actuate the first wall of the synthetic jet actuator, a base voltage of the electrical potential applied to the innermost one of the pair of piezoelectric layers of the first wall also applied to the first electrode, a second power supply comprising a switchable power supply electrically connected to the second wall to apply electrical potential to the pair of piezoelectric layers of the second wall to actuate the second wall of the synthetic jet actuator, a base voltage of the electrical potential applied to the innermost one of the pair of piezoelectric layers of the second wall also applied to the second electrode, the second power supply configured to selectively switch between providing:

an electrical potential sufficient to actuate the pair of piezoelectric layers of the second wall and having a first base voltage having a value providing a substantial voltage offset from a value of the base voltage of the electrical potential of the first power supply sufficient to provide for formation of the arc between the first and the second electrodes to enhance fluid expulsion from the chamber, the substantial voltage offset provided by the first base voltage of the electrical potential applied by the second power supply being sufficient to provide the minimum electrical potential between the first and the second electrodes to break down environmental fluid within the chamber at a between-electrode gap distance at least equal to a distance between the first and the second electrodes when the first wall is actuated by the first power supply to provide maximum inward deflection thereof and the second wall is actuated by the second power supply to provide maximum inward deflection thereof, and an electrical potential sufficient to actuate the pair of piezoelectric layers of the second wall and having a second base voltage having a value insufficiently different from the value of the base voltage of the electrical potential applied to the pair of piezoelectric layers of the first wall to provide for the formation of the arc between the first and the second electrodes.

20. A synthetic jet actuator system defined in claim 19, further comprising:

a third power supply in electrical communication with the second power supply to provide the second power supply with the electrical potential having the second base voltage.

21. A synthetic jet actuator system defined in claim 19, further comprising one or more of the following:

a controller positioned in communication with the second power supply and configured to cause the second power supply to switch the second power supply electrical potential usage from the electrical potential having the second base voltage to the electrical potential having the first base voltage, responsive to detecting insufficient output from the synthetic jet actuator, to form the arc between the first and the second electrodes to thereby enhance fluid expulsion from the chamber; and a controller positioned in communication with the second power supply and a flight control computer of an aircraft to switch the second power supply electrical potential usage between the electrical potential having the second base voltage and the electrical potential having the first base voltage responsive to control signals indicating a desired level of fluid expulsion from the chamber.

22. A method of controlling fluid flow utilizing a synthetic jet actuator, the method comprising the steps of:

actuating a pair of opposing walls to contract inwardly toward a center of a chamber of a synthetic jet actuator to expel a fluid from within the chamber, each wall comprising a pair of piezoelectric layers forming a bimorph; and forming an arc between a pair of opposing electrodes each connected to an inner surface of a separate one of the pair of opposing walls to enhance expulsion of the fluid from within the chamber.

23. A method as defined in claim 22, wherein the first wall includes a location of maximum inward deflection when deflected toward the center of the chamber;

wherein at least portions of the first electrode are positioned approximately coincident with the point of maximum inward deflection of the first wall;

wherein the second wall includes a location of maximum inward deflection when deflected toward the center of the chamber;

wherein at least portions of the second electrode are positioned approximately coincident with the point of maximum inward deflection of the second wall; and wherein the step of forming an arc includes the steps of applying a first voltage potential to the bimorph of the first wall and a second voltage potential to the bimorph of the second wall, a value of a base voltage of the second voltage potential having a substantial voltage offset from a value of a base voltage of the first voltage potential, the voltage offset causing the fluid within the chamber to break down when the pair of walls have contracted inwardly to a preselected gap distance therebetween.

24. A method as defined in claim 22, wherein the step of forming an arc includes the steps of:

applying a first voltage potential to the bimorph of the first wall;

applying a second voltage potential to the bimorph of the second wall, a value of a base voltage associated with the second voltage potential having an insubstantial voltage offset from a value of a base voltage associated with the first voltage potential, the voltage offset insufficient to cause the fluid within the chamber to break down; and switchably providing a third voltage potential to the bimorph of the second wall, the third voltage potential being substantially similar to the first voltage potential, a value of a base voltage associated with the third voltage potential having a substantial voltage offset from a value of a base voltage associated with the first voltage potential, the substantial voltage offset sufficient to cause the fluid within the chamber to break down.

25. A method as defined in claim 24, wherein the second voltage potential and the third voltage potential are both substantially similar to the first voltage potential, and wherein the step of switchably providing the third voltage potential to the bimorph of the second wall includes one or more of the following steps:

causing a power supply to switch from using the base voltage associated with the second voltage potential to using the base voltage associated with the third voltage potential responsive to detecting insufficient output from the synthetic jet actuator to thereby form the arc between the first and the second electrodes; and causing the power supply to switch from using the base voltage associated with the second voltage potential to using the base voltage associated with the third voltage potential responsive to receiving control signals indicating a desired level of fluid expulsion from the chamber.

26. A method as defined in claim 22, wherein the step of actuating the pair of opposing walls to contract inwardly toward the center of the chamber includes the step of applying a first voltage potential to the bimorph of the first wall and to the bimorph of the second wall to expel the fluid from within the chamber; and wherein the step of forming an arc includes the step of applying to the pair of electrodes a second voltage potential sufficient to cause the fluid within the chamber to break down to enhance expulsion of the fluid within the chamber responsive to one or more of the following:

detecting insufficient output from actuation of the pair of opposing sidewalls absent formation of the arc, and receiving control signals indicating a desired level of fluid expulsion from the chamber exceeding that capable of being provided by actuation of the pair of opposing sidewalls absent formation of the arc.

* * * * *